(12) United States Patent
Jarvis et al.

(10) Patent No.: US 10,614,831 B2
(45) Date of Patent: Apr. 7, 2020

(54) AUDIO ACTIVITY TRACKING AND SUMMARIES

(71) Applicant: QUALCOMM Incorporated, San Diego, CA (US)

(72) Inventors: Murray Jarvis, Cambridge (GB); Benjamin Tarlow, Cambridge (GB); Nicolas Graube, Cambridge (GB); Clark Don Woolstenhulme, Cambridge (GB); Simon Finch, Newmarket (GB)

(73) Assignee: Qualcomm Incorporated, San Diego, CA (US)

( * ) Notice: Subject to any disclaimer, the term of this patent is extended or adjusted under 35 U.S.C. 154(b) by 19 days.

(21) Appl. No.: 15/782,287

(22) Filed: Oct. 12, 2017

(65) Prior Publication Data

US 2019/0115045 A1 Apr. 18, 2019

(51) Int. Cl.

| | |
|---|---|
| *G10L 25/54* | (2013.01) |
| *G10L 25/51* | (2013.01) |
| *G10L 25/03* | (2013.01) |
| *G06F 16/60* | (2019.01) |
| *G10L 17/00* | (2013.01) |
| *G10L 25/63* | (2013.01) |
| *G10L 25/66* | (2013.01) |
| *G10L 15/08* | (2006.01) |

(52) U.S. Cl.
CPC .............. *G10L 25/54* (2013.01); *G06F 16/60* (2019.01); *G10L 17/005* (2013.01); *G10L 25/03* (2013.01); *G10L 25/51* (2013.01); *G10L 25/63* (2013.01); *G10L 25/66* (2013.01); *G10L 2015/088* (2013.01)

(58) Field of Classification Search
CPC ......... G10L 25/54; G10L 17/00; G10L 25/63; G10L 25/66; G10L 25/51; G10L 17/26; G10L 21/028; G01S 3/808; G01S 5/18; G01S 5/28
USPC ....... 700/94; 704/270, 201, 246; 381/23, 56, 381/110
See application file for complete search history.

(56) References Cited

U.S. PATENT DOCUMENTS

2016/0066113 A1\* 3/2016 Elkhatib .............. H04R 29/004
 381/56
2016/0320847 A1\* 11/2016 Coleman ............. G06F 3/04842
(Continued)

FOREIGN PATENT DOCUMENTS

EP 3288035 A2 2/2018

OTHER PUBLICATIONS

Al Masum Shaikh M et al: "Automatic Life-Logging: A novel approach to sense real-world activities by environmental sound cues and common sense", Computer and Information Technology, 2008. ICCIT 2008. 11 Th International Conference on, IEEE, Piscatway, NJ, USA, Dec. 24, 2008 (Dec. 24, 2008), pp. 294-299, XP031.*
(Continued)

*Primary Examiner* — Melur Ramakrishnaiah
(74) *Attorney, Agent, or Firm* — Qualcomm Incorporated

(57) ABSTRACT

Various embodiments provide systems and methods which disclose a device which may be used to determine an audio event based on receiving an audio signal. Based on the determined audio event, audio activity may be tracked. The tracked audio activity may be summarized based on a summary mode. Feedback of the summarized tracked audio activity may be based on a feedback mode.

28 Claims, 11 Drawing Sheets

(56) References Cited

U.S. PATENT DOCUMENTS

2016/0364963 A1* 12/2016 Matsuoka ................ H04R 3/00
2017/0154638 A1* 6/2017 Hwang .............. G06K 9/00711

OTHER PUBLICATIONS

Bi Y., et al., "AutoDietary: A Wearable Acoustic Sensor System for Food Intake Recognition in Daily Life", IEEE Sensors Journal, IEEE Service Center, New York, NY, US, vol. 16, No. 3, Feb. 1, 2016, XP011591974, ISSN: 1530-437X, DOI: 10.1109/JSEN.2015.2469095 [retrieved on Jan. 12, 2016], pp. 806-816.

International Search Report and Written Opinion—PCT/US2018/055739—ISA/EPO—Jan. 2, 2019.

Shaikh M.A.M., et al., "Automatic Life-Logging: A Novel Approach to Sense Real-world Activities by Environmental Sound Cues and Commonsense", Proceedingsof 11th International Conference on Computer and Information Technology (ICCIT 2008), Piscataway, NJ, USA, Dec. 24, 2008, XP031443038, ISBN: 978-1-4244-2135-0, pp. 294-299.

\* cited by examiner

AUDIO ACTIVITY TRACKING AND SUMMARIES

BACKGROUND

Field

The present disclosure is generally related to audio processing and user interfaces.

Background

Advances in technology have resulted in fitness bands or activity trackers that are becoming used by more consumers to track their physical activities (e.g., the fitbit device or wearable watches). These fitness and activity trackers are typically worn, and include sensors to measure a person's heart beat or measure movement and are coupled to transceivers within the wearable device. In many cases the wearable devices wirelessly transmit fitness or activities (e.g., steps, calories burned, or amount of time standing) to a smart phone or other mobile device through Bluetooth wireless communication.

In the last few years, the term "hearables" has been used to describe the use of a wearable device and a headphone. Hearables also include loudspeakers to play sound, and microphones to capture voice commands or talk on the phone. Hearables may include sensors to track heart rate, temperature, oxygen saturation, or cadence. In addition, a hearable may include a Bluetooth integrated circuit to communicate with a smart phone or mobile device. Some hearables are capable of Wi-Fi and cellular connectivity that allow users to make phone calls without wireless pairing to a phone. Advances in speech recognition have also been increasing with advances in machine learning, and is an additional technology that may be included in a hearable.

As technology in hearables continues to advance new challenges and opportunity may arise.

SUMMARY

The various embodiments include methods for a device that include one or more processors to determine an audio event based on receiving an audio signal. The one or more processors track an audio activity based on the determined audio event and summarize the tracked audio activity based on a summary mode. Moreover, the one or more processors provide feedback of the summarized tracked audio activity based on a feedback mode. In addition, the one or more processors may select a feedback mode, and display the summarized tracked audio activity based on visual feedback mode. In the same or alternate embodiment, the summarized tracked audio activity may be audible when the selected feedback mode is an audible feedback mode.

There are various embodiments that includes a method determining an audio event based on receiving an audio signal. The method includes tracking activity based on the determined audio event and summarize the tracked audio activity based on a summary mode. Moreover, the method includes providing feedback of the summarized tracked audio activity based on a feedback mode. In addition, in an embodiment, the method includes selecting a feedback mode, and displaying the summarized tracked audio activity based on visual feedback mode. In the same or alternate embodiment, the method includes summarizing the tracked audio activity, and may be audible when the selected feedback mode is an audible feedback mode.

There are various embodiments that include an apparatus that includes means for determining an audio event based on receiving an audio signal and means for tracking an audio activity based on the determined audio event. Moreover, the apparatus includes means for summarizing the tracked audio activity based on a summary mode and means for providing feedback of the summarized tracked audio activity based on a feedback mode.

There are various embodiments that include a non-transitory computer-readable storage medium having stored thereon instructions that, when executed, cause one or more processors of a device to determine an audio event based on receiving an audio signal and determine an audio event based on receiving an audio signal. The instructions, when executed, also cause the one or more processors to track an audio activity based on the determined audio event, summarize the tracked audio activity based on a summary mode, and provide feedback of the summarized tracked audio activity based on a feedback mode.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

Figure 1:
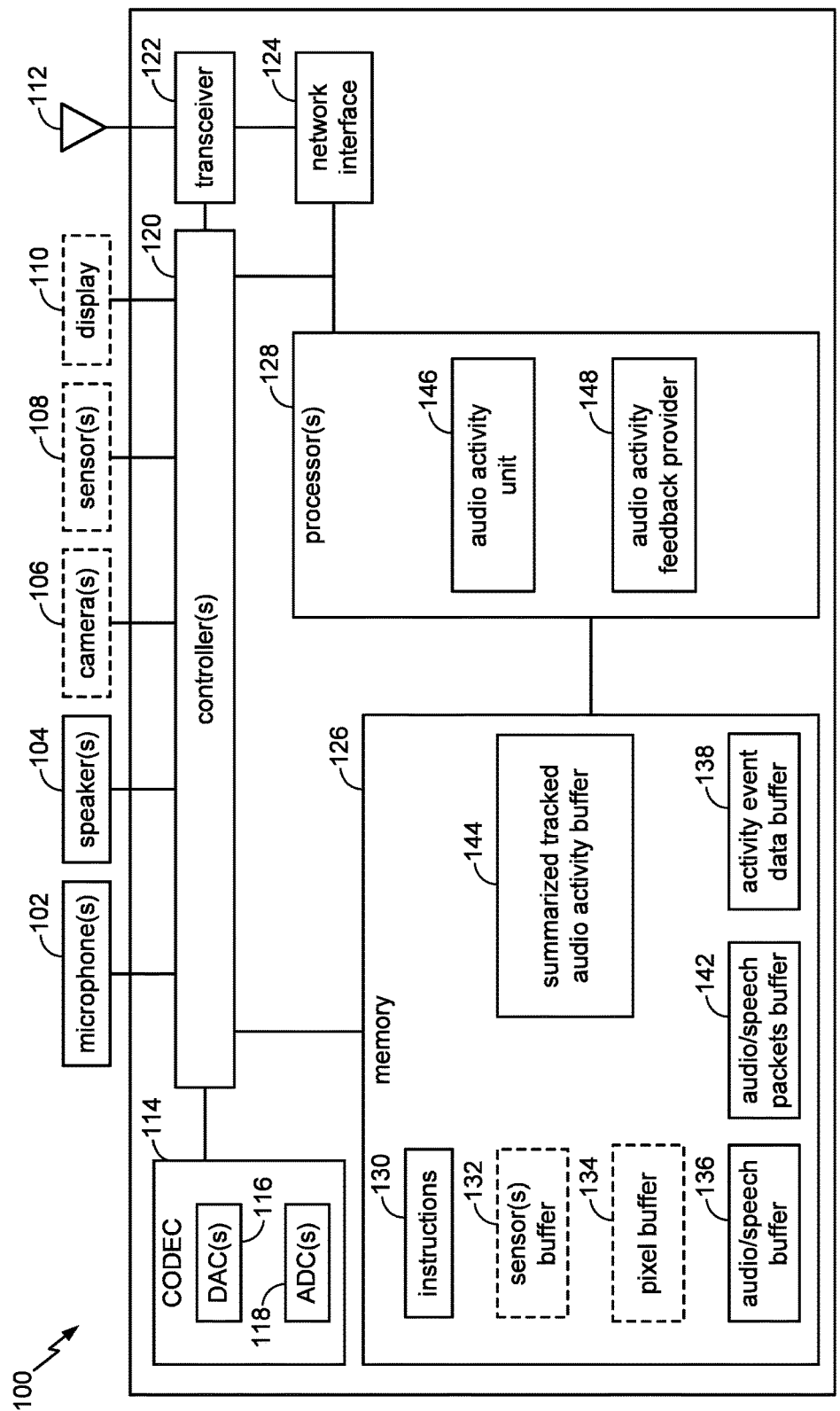
FIG. 1 is a is a component block diagram illustrating an example of a device suitable for implementing various embodiments disclosed herein.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

DETAILED DESCRIPTION

Particular implementations of the present disclosure are described below with reference to the drawings. In the description, common features are designated by common reference numbers throughout the drawings. As used herein, various terminology is used for the purpose of describing particular implementations only, and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include,"

"includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold with". A device may be integrated if a user buys a package that bundles or includes the device as part of the package. In some descriptions, two devices may be coupled, but not necessarily integrated (e.g., different peripheral devices may not be integrated to a device, but still may be "coupled"). Another example, may be the any of the transceivers or antennas described herein that may be "coupled" to a processor, but not necessarily part of the package that includes a device. Other examples may be inferred from the context disclosed herein, including this paragraph, when using the term "integrated".

As used herein, "provide" may include "sending", e.g. one or more processors may provide an output signal or signals to another component, may equivalently mean, the one or more processors may send the output signal or signals to another component.

As used herein, "a wireless connection" between devices may be based on various wireless technologies, such as Bluetooth, Wireless-Fidelity (Wi-Fi) or variants of Wi-Fi (e.g., Wi-Fi Direct. Devices may be "wirelessly connected" based on different cellular communication systems, such as, a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. In addition, when two devices are within line of sight, a "wireless connection" may also be based on other wireless technologies, such as ultrasound, infrared, pulse radio frequency electromagnetic energy, structured light, or directional of arrival techniques used in signal processing (e.g., audio signal processing or radio frequency processing).

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

The term "audio signal" may be used interchangeably at different stages after one or more microphones have captured or recorded a sound wave impinging on the one or microphones. In addition, the term audio signal may also be used interchangeably at different stages of receiving a packet from another device.

The terms "mobile device", "connected device", "wireless device," and "wireless node" are used interchangeably herein to refer to any electronic device that includes circuitry for wirelessly sending and/or receiving information, including any one or all of cellular telephones, personal or mobile multi-media players, watches, wrist displays, medical devices, headsets, headphones, speakers, microphones, computing devices, and other similar electronics.

As used herein A "and/or" B may mean that either "A and B", or "A or B", or both "A and B" and "A or B" are applicable or acceptable.

FIG. 1 is a block diagram illustrating exemplary components of a device 100. The device 100 may be a hearable device, or may be another device that does not necessarily include speakers in or around a person's ear. For example, another device may be a home speaker that includes microphones, or a smart watch. The device 100 may also include exemplary components such as one or more sensors, one or more cameras, and/or a display device which also incorporate some of the embodiments disclosed herein.

In a particular implementation, the device 100 includes a processor 128 which includes: a central processing unit (CPU); or a digital processor (DSP); or, a graphics processing unit (GPU), coupled to the memory 126. The memory 126 includes instructions 130 (e.g., executable instructions) such as computer-readable instructions or processor-readable instructions. The instructions 130 may include one or more instructions that are executable by a computer, such as the processor 128.

FIG. 1 also illustrates one or more controllers 120 that are coupled to the processor 128, and to one or more components in the device 100. For example, the one or more controllers 120 may be coupled to various peripheral devices (e.g., the display device 110, sensor(s) 108, camera(s) 106, and microphone(s) 102). As described herein the display device 110 may not be integrated with the device 100, or, in implementations associated with the descriptions with the device 100 disclosed herein.

An audio/speech coder/decoder (CODEC) 114 may also be coupled to the processor 128 and memory 126. The microphone(s) 102 may be coupled to the audio/speech CODEC. The audio/speech CODEC output may be an audio/speech buffer 136 and may store samples of audio and/or speech captured by the microphone(s) 102. The samples may be part of an audio waveform. A person of ordinary skill in the art may refer to audio/speech samples as either audio or speech samples or both. Audio samples which are in the temporal frequency of voice may be referred to as speech samples. A video coder/decoder (CODEC) (not drawn) may also be coupled to the processor 128 and memory 126. The camera(s) 106 may be coupled to the video CODEC. The video CODEC output may be a pixel buffer 131 and may store pixels of video captured by the camera(s) 106. The pixels of video captured by the camera(s) 106 may include an image or a portion of an image of the environment or scene near the device 100. Alternatively, or additionally, the pixels of video captured by the camera(s) 106 may include an image or portion of an image of a user. The one or more sensor(s) 108 may be coupled to the processor 128 and memory 126. The output of the sensor(s) 108 may be a sensor buffer 132 and may store samples of location data described herein captured by the sensor(s) 108.

The device 100 may include transceiver 122, and the transceiver 122 may be coupled to the processor 128 and to an antenna 112, such that wireless data received via the antenna 112 and the transceiver 122 may be provided to the processor 128. The device 100 may also include a network interface 124 that implements communication protocols. In some implementation of the device 100, the network interface 124 may be directly integrated into the processor 128. In some implementations, the processor 128, the controller(s) 120, the memory 126, and the transceiver 122 may be included in a system-in-package or system-on-chip device. In some implementations, the various peripherals may be integrated into the device 100.

Moreover, in a particular implementation, as illustrated in FIG. 1, the display device 110, sensor(s) 108, camera(s) 106, and microphone(s) 102) the antenna 112, are external to the system-on-chip device. In a particular implementation, each of the display device 110, sensor(s) 108, camera(s) 106, microphone(s) 102), and the antenna 112, may be coupled to a component of the system-on-chip device, such as one or more controller(s) 120, or the memory 126.

The device 100 may include a headset, smart glasses, or augmented reality devices, virtual reality devices, mixed reality devices, extended reality devices, a robot, mobile communication device, a smart phone, a cellular phone, a laptop computer, a computer, smart glasses, a tablet, a personal digital assistant, a television, a gaming console, a music player, a radio, a digital video player, as part of an audio system in a vehicle, a digital video disc (DVD) player, a standalone camera, a navigation device, a vehicle, a component of a vehicle, or any combination thereof, as illustrative, non-limiting examples.

In an illustrative implementation, the memory 126 may include or correspond to a non-transitory computer readable medium storing the instructions 130. The instructions 130 may include one or more instructions that are executable by a computer, such as the processors 128. The instructions 130 may cause the processor 128 to perform one or more operations described herein, including but not limited to one or more portions of the descriptions associated with any of the FIGS. 1-10.

The device 100 may include an audio activity unit 116, audio activity feedback provider 118, audio event buffer 138, summarized tracked audio activity buffer 144, audio/speech packets buffer 142. The buffers, audio activity unit 116 and audio activity feedback provider 118 are described in more detail at various placed within this disclosure.

Figure 2:
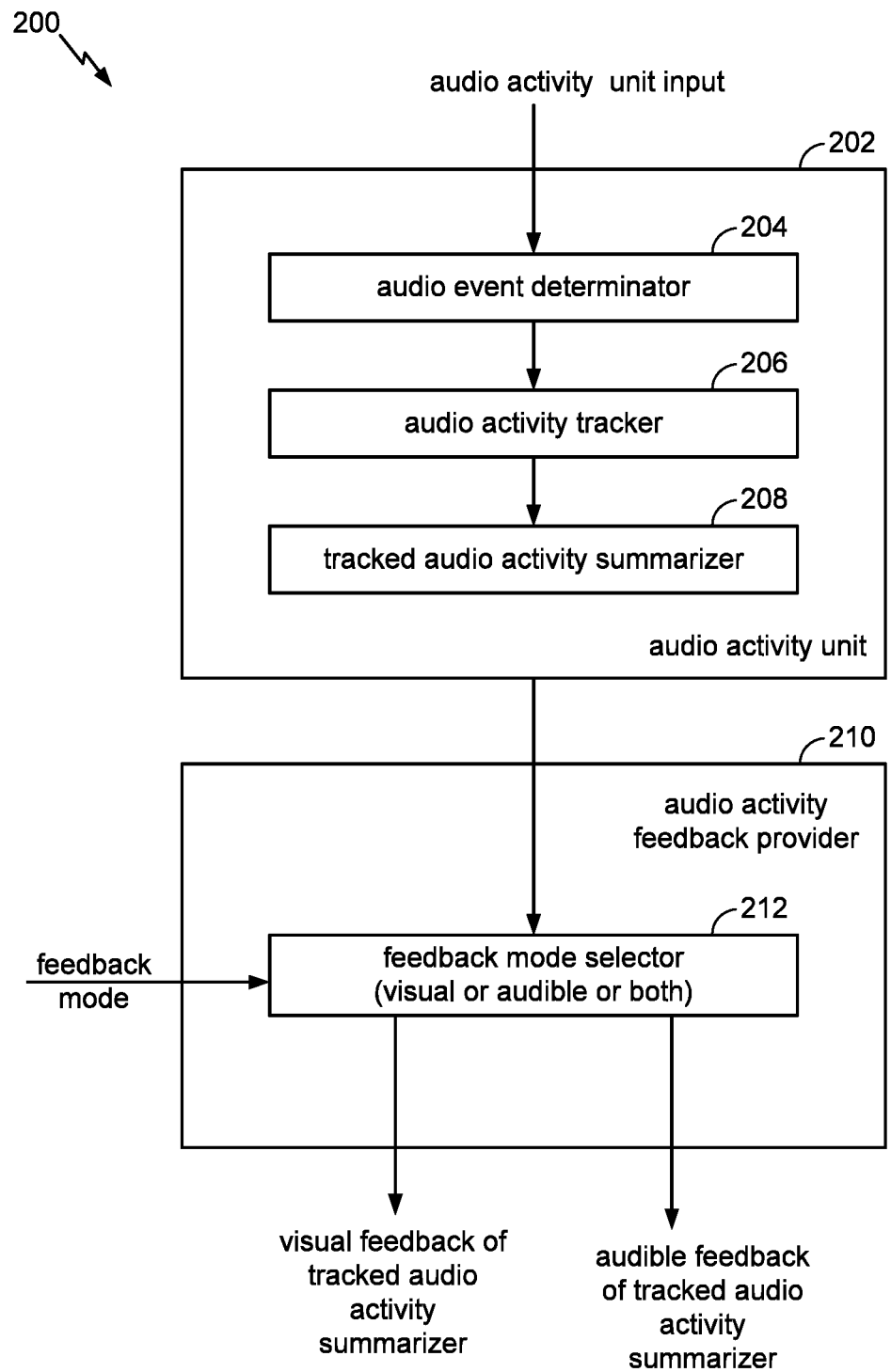
FIG. 2 illustrates a block diagram which includes an audio activity unit and audio activity feedback provider.

FIG. 2 illustrates a block diagram which includes an audio activity unit and audio activity feedback provider. As processor technology continues to scale down to smaller node sizes, it is envisioned that functionality of digital assistants, such as the Amazon Echo or Google Home may also be incorporated into wearable devices. One advantage of wearing a device is the ability to track social interactions of users across multiple environments (e.g., in a car, home, office).

Another advantage of wearing a device, such as a hearable, watch, or smart glasses, as examples, is that the microphones of these devices may not be in a pocket or purse as sometimes occurs with smartphones throughout a user's day. In some embodiments, there may be better correlation between recording or capturing an audio signal and the representative experience for the wearer.

For example, a wearable may be more stable than in an alternate placement in some cases, and may lead to more localized correlated with real wearer experience. In addition, for a wearable (e.g. a wearable sensor), there may be advantages in placing sensors at different points on the body in order to gain different type of measurement of a common physical event. Placing a sensor at different places may lead to different challenges and limitations, however, an advantage of such placements is that body motion (e.g. a foot sensor, a wrist sensor, sensor's around a belt, or hearables) may increase the confidence in audio event detection and/or may lead to audio event detection. As such, they may have in some embodiments, advantages over a phone, for example, which may be potentially floating and with a weak, fluid, and undetermined in relation to the user's motion, or at least part of the user's motion (e.g. arms, feet, etc.).

Non-wearable devices may also incorporate one or more of the embodiments disclosed herein. It is also envisioned that devices which include an audio activity unit 202 and/or an audio activity feedback provider unit 210 will have increased technological capabilities arising from the transfer of information between wirelessly connected devices, larger memory sizes, and/or advances in machine learning. For example, a sensor that allows local capture but that may require more processing for analysis may benefit from connection and remote processing. As such, the ability to track other audio activities, in addition to social interactions, aims to capture the overall audio experience and translate it into activities, and summarize the experiences beyond social interactions. In addition, it will become possible to provide summarize audio activities based on different types of summary modes. A summary mode is discussed in FIG. 5.

Examples of audio activities beyond social interactions (i.e., a social interaction involves at least two people having a back and forth discussion) may include time spent listening to television or music. Other examples may be related to categorizing emotions (e.g., angry, happy, neutral, etc.), or categorizing time spent talking (or listening) based on audio signal level (e.g., shouting or whispering). Yet other examples include time spent listening to different types of people (e.g., children vs adults, or male vs. female). Based on audio activities, the audio feedback provider 210 may provide visual or audible feedback to users.

In an embodiment, a device (such as device 100) includes an audio activity unit 202 that includes an audio event determinator 204 (see FIG. 3) configured to determine an audio event based on receiving an audio signal. An audio event arises based on an object or person making a sound. Examples of audio events have been disclosed in "Detection and Classification of Acoustic Scenes and Events" by Stowell et al. in IEEE Transactions of Multimedia, Vol. 17, No. 10, October 2015. Audio event examples include door knock, door slam, speech, laughter, clearing throat, coughing, drawer, printer, keyboard click, mouse click, marker on table surface, placing keys on a table, phone ringing, a short alert (e.g., a beep), and a page turning. Audio events are not limited to only these examples. Other non-limiting examples of audio events include chair moving, a musical instrument being strung (e.g., a guitar), beat (e.g., drum), bottle placed on table, blender sound, helicopter sound, and the like.

In the same or alternate embodiment, the audio event determinator 204 is coupled to an audio activity tracker 206 (see FIG. 4) configured to track audio activity based on the determined audio event.

In the same or alternate embodiment, the device includes an audio activity tracker 206 coupled to a tracked audio activity summarizer 208 (see FIG. 5) which is configured to summarize the tracked audio activity based on a summary mode.

Figure 9:
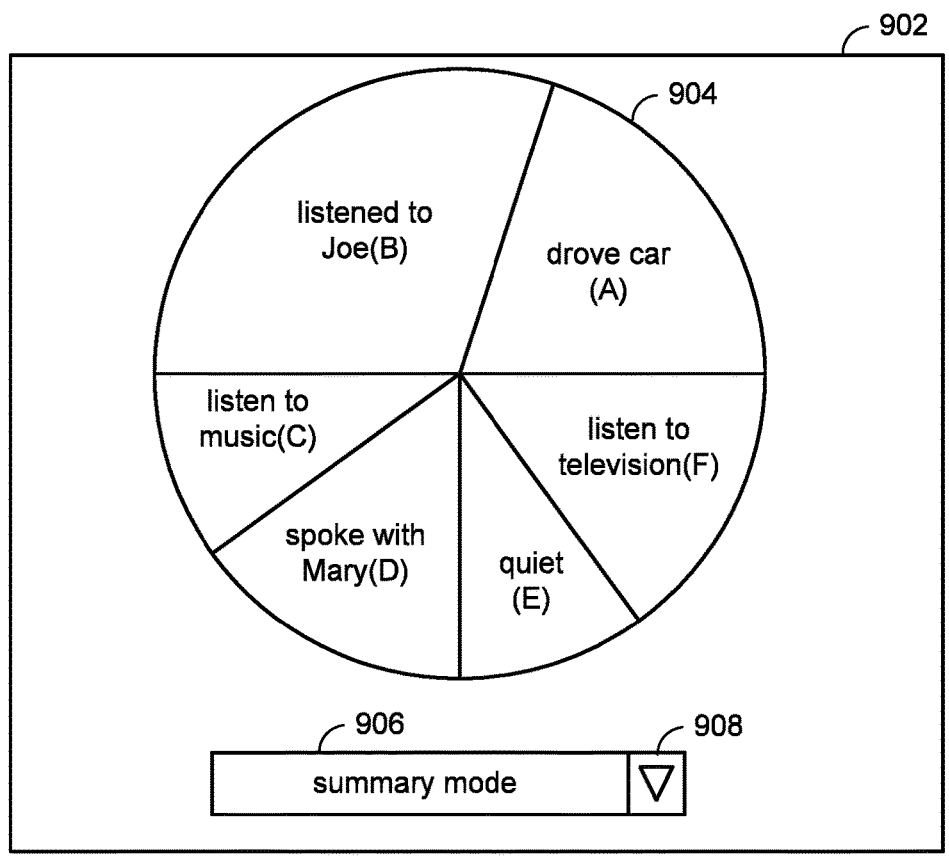
FIG. 9 illustrates an exemplary view of a summary of daily audio activity on a display.
Figure 10:
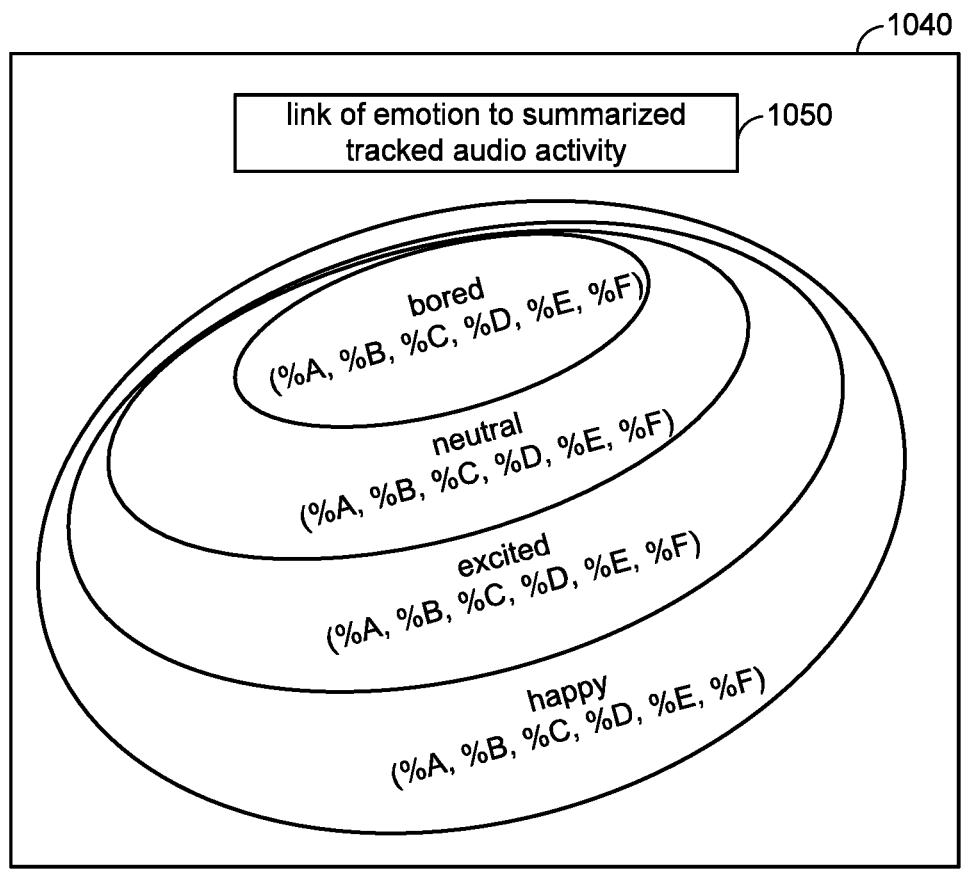
FIG. 10 illustrates another exemplary view of a link to an emotion associated with the summarized tracked audio activities on a display.

In the same or alternate embodiment, the device includes audio activity feedback provider 210 that includes a feedback mode selector 212. The feedback mode selector 212 may be configurable through a feedback mode setting. For example, a user of the device may configure the feedback mode selector 212 to provide audible or visual feedback or both, on the summarized audio. Exemplary feedback of tracked audio activities are illustrated in FIG. 9, and FIG. 10.

Figure 3:
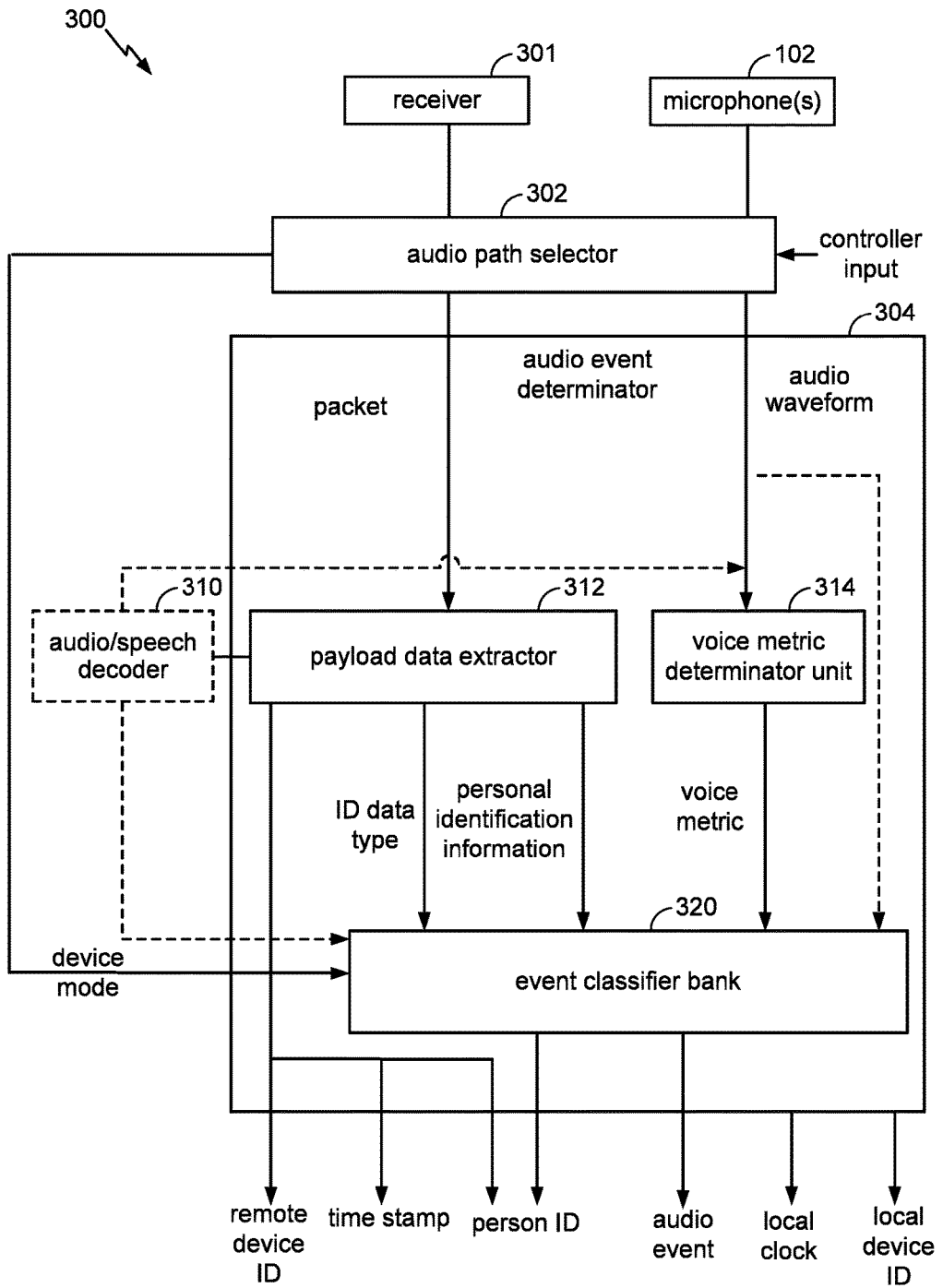
FIG. 3 illustrates multiple embodiments of an audio event determinator.
Figure 7:
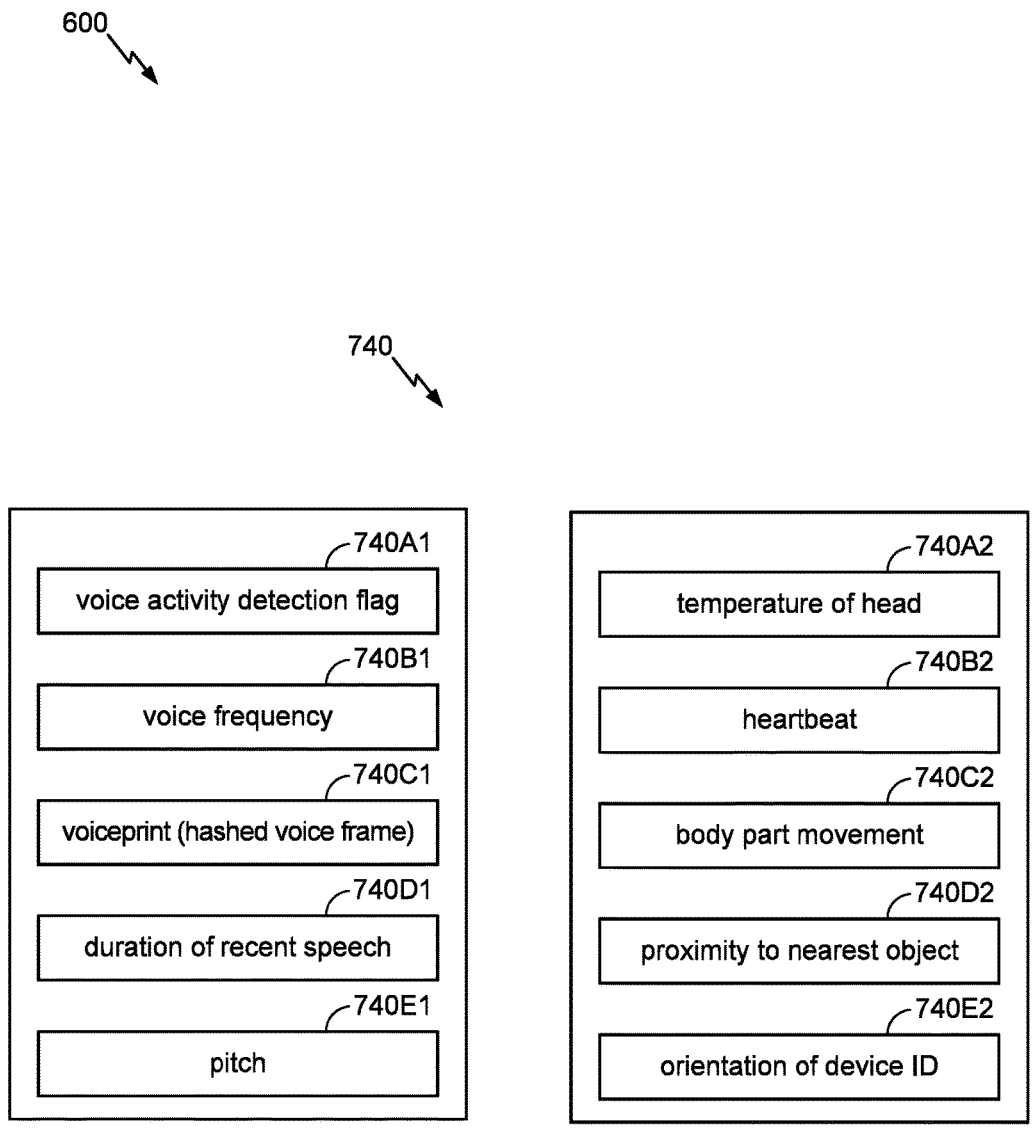
FIG. 7 illustrates different type of personal identification.

FIG. 3 illustrates multiple embodiments of an audio event determinator 302. In an embodiment, the event determinator 304 is coupled to an audio path selector 302. The audio path selector 302 is configured to select whether an audio waveform, based on output from a one or microphones 102, is provided to the audio event determinator 304. The audio waveform may be output from a CODEC 114. The audio waveform may be provided to an event classifier bank 320, or in the same or alternative embodiment may be provided also to a voice metric determinator unit 314. The voice metric determinator unit 314 may calculate one or more voice metrics which aid in the speech processing and/or classification. Exemplary voice metrics are illustrated in FIG. 7 as 740A1-740E1 (voice activity detection flag, voiced frequency, hashed voiced frame, duration of recent speech and pitch).

In the same or alternative embodiment, the audio path selector 302 is coupled to a receiver 301. The receiver 301 is configured to accept a signal from a different device. The signal may include a data packet, audio packet or speech packet. The data packet may encapsulate an audio packet or speech packet. For ease of description, a packet may be a data packet, audio packet or speech packet unless expressly denoted otherwise. The audio packet or speech packets may be stored in an audio/speech packets buffer 142 (see FIG. 1). The data packet may be stored in a data packet buffer (not shown). The audio path selector 302 may receive a controller input from one or more of the controllers 120 which may aid in the selection of whether a packet or audio waveform is provided to the audio event determinator 304.

In the same or alternative embodiment, the packet may be provided to the audio event determinator 304. The packet may be received by a payload data extractor 312. The payload data extractor 312 may extract an identification data type (ID) 630, and/or personal identification information 640 from the packet (see FIG. 6). For example, the payload data extractor 312 may extract person identification 620, i.e., one or more bits that indicate who the person is. If two people are speaking, for example, Zoe and Max, Zoe's device may send over one or more bits representing that is in fact Zoe to Max's device. Max's device may include the payload data extractor 312. The person identification that it is Zoe may be based on the result of speech recognition, face recognition, or some other recognition technology that is located on Zoe's device, a remote device to Max's device. For example, Max's device may be device 100, and Zoe's voice or face is captured on a separate device.

In the same or alternate embodiment, Max's device may broadcast an identification associated with Max's device, which may for example, be included as an alternate to one of the described fields (630, 640 or 620), or take the place of one of the fields, e.g., the identification data type 630 may be identify Max's device. In an embodiment, the identification of Max's device may be a random number (that is fixed or varies depending on use case) to provide additional security and uniqueness. The identification data type 630 may be a result of a configuration set by the user (i.e., Max).

A group configuration or setting may allow permissions to dissociate the person identification 620 or personal identification information 640 from the identification data type 630. In an embodiment, the devices may be within proximity (e.g., bumping or with NFC) to allow for the exchange of identification data type 630 that includes the user identification (e.g., 1234567). Subsequently, depending on the configuration, a broadcast user identification of 1234567 may be received by the device 100 in a packet, and the information in the fields (630, 640, or 620) of the packet may be used in an audio activity tracker 206 of the device 100.

Other embodiments, may exist to exchange permissions mediated through the internet or private messaging to allow for signing up to groups and allow for permissions for specific individuals. In the same or alternative embodiment, the payload data extractor 312 may extract personal identification information 640. Numerous examples (740A1-740E1, and 740A2-740E2) of personal identification information are illustrated in FIG. 7. A person of ordinary skill in the art would appreciate that the remote device may have its own voice metric determinator unit which may be sent to device 100.

In the same or alternative embodiment, a timestamp may also be extracted from the payload data extractor 312. The timestamp from a remote device may arrive at the same time, or relatively close in time to the ID data type 630, personal identification information, or person identification to allow for a time correlation (e.g., may be based on a common time) with other audio events associated with the ID data type 630, personal identification 640, or person identification 620. The payload data available in the timestamp that arrives, was captured at a different physical location and space than that of device 100. The timestamp and associated information (i.e., the payload data fields (620, 630, and 640) that are time assigned is transferred to device 100 from one or more different remote devices that provided the packet(s) which contain the payload data and timestamp, which in turns allows the audio activity tracker 206 to include in a time based analysis.

In the same or alternative embodiment, the packet may be provided directly to an audio/speech decoder 310. After the audio/speech decoder 310 decompresses the audio/speech packets, the reconstructed audio and/or speech waveform may also be provided to the voice metric determinator unit 314. In addition, the reconstructed audio and/or speech waveform may be provided to the event classifier bank 320. As the event classifier bank 320 may receive an input based off of a packet or an audio waveform, in an embodiment the event classifier bank 320 may also receive as input a device mode which indicates whether the input provided is from the local device (e.g., device 100) or a remote device. Depending on the device mode the event classifier bank 320 may be controlled. The event classifier bank 320 may selectively use memory or classifiers that respond to inputs from the local device (e.g. device 100), or alternatively, selectively use memory or classifiers that respond to inputs from a remote device.

In embodiments where the inputs into the event classifier bank 320 are ID data type, and/or personal identification information, and/or reconstructed audio and/or speech waveform, and/or a voice metric based on the reconstructed audio and/or speech waveform, the device mode may have one value represented by one or more bits, and may be set by device 100. In embodiments, where he inputs into the event classifier bank 320 is the audio waveform and/or a voice metric based on the audio waveform the event classifier bank 320, the device mode may have a different value (associated with device 100) represented by one or more bits, and may also be set by the device 100. In addition, control of the event classifier bank 320 may also depend on the application. As such, the event classifier bank 320 may additionally also output a remote device ID, time stamp of the remote device, person ID, local clock (of device 100), and a local device identification value (i.e., ID of device 100).

Figure 4:
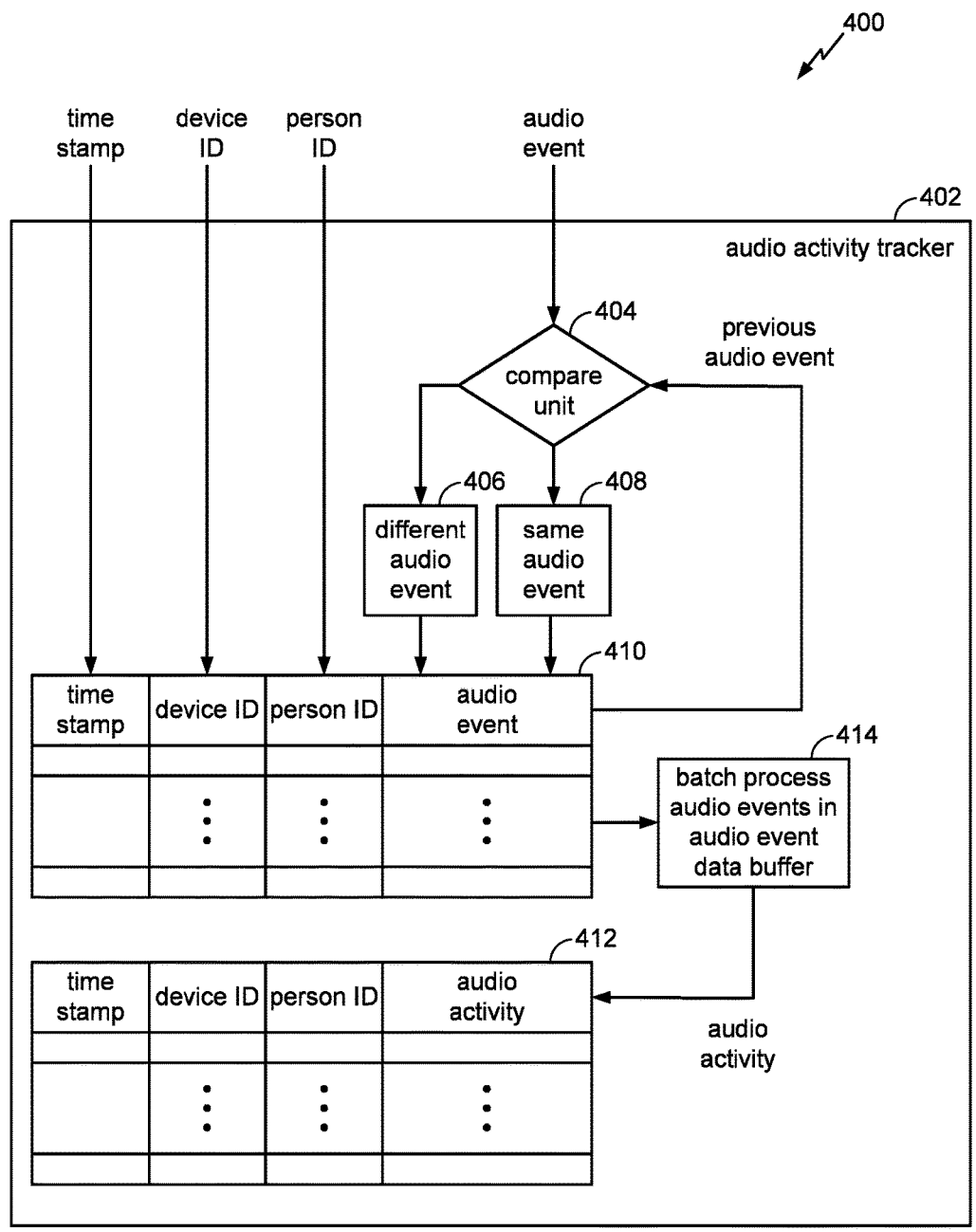
FIG. 4 illustrates an exemplary implementation of an audio activity tracker.

FIG. 4 illustrates an exemplary implementation of an audio activity tracker. The exemplary audio activity tracker 402 may include inputs of time stamp (whether a local clock, or remote timestamp), a device ID (whether a local device ID, or a remote device ID), a person ID, and/or an audio event. Non-limiting examples of audio events were provided when describing FIG. 2, but skilled artisans would appreciate that the number of audio events that may be determined with the techniques described herein span a number of situational environments, contexts, and applications.

In an embodiment, the audio activity tracker 402 may include a compare unit 404. The compare unit 404 may perform a comparison between a current audio event and a previous audio event, and determine whether the current audio event is the same audio event 408 or a different audio event 406 as the previous audio event. A comparison may be based on a subtraction. However, the comparison may in the same or alternative embodiment, be based on evaluating whether the current audio event value (or sets of values representing the current audio event) are greater or less than the previous audio event value (or sets of values representing the previous audio event value). Whether the comparison is based on a greater than or less than inequality may be based on an application, or design choice. In addition, a compare unit may include using logarithms, absolute values, or thresholds depending on an application, or design choice.

An audio event data buffer 410 may store whether the value or values representing the same audio event 408 or different audio event 406. The audio event data buffer 408 may also store the current audio event. In addition, in the same or alternative embodiment, the audio event data buffer 410 may store one or more of the time stamp, device ID, or person ID, as illustrated in FIG. 4. In the same or alternate embodiment, an audio buffer 138 may separately store audio events.

Text labels may be generated based on what the audio events may represent. For example, an audio event may represent a keyboard click. The text label may be "a keyboard key click". Skilled artisans would appreciate that an audio event may also represent several keyboard clicks, and the text label may be "keyboard keys clicking". If there is a jet flying overhead, a source separator may separate out the jet sounds flying overhead and a text label may be "jet flying overhead". The keyboard keys clicking and the jet flying overhead may be considered as two separate audio events, or may in some embodiments represent one audio event of "keyboard keys clicking while a jet is flying overhead".

A person having ordinary skill in the art would appreciate that in an embodiment the text label of the audio event may also be stored in the audio event data buffer 410.

Within this disclosure, reference to an audio event may include audio or speech samples of the audio event, or interchangeably reference to an audio event may include a text label. In addition, an audio event may be a collection of audio events, e.g., keyboard keys clicking may be a collection of a series of keyboard key clicks.

Whether as text labels, or as audio or speech samples of the audio event, the audio events may be batched processed 414 (see FIG. 8) to determine the audio activity. Additional context to the determined audio event may determine the audio activity. For example, if the audio events (or the text represent shortness of breath, and/or rapid footsteps, the determined audio activity may be running. If the audio events represent rapid footsteps sound like they are on cement or sand that may represent that the determined audio activity is running on cement or sand. The time stamp, device ID, and person ID may also provide more context. For example, the determined audio activity may be Max (indicated by person ID) is running on cement or sand at 1 pm (indicated by time stamp) and is wearing a watch (indicated by device ID).

After the audio activity tracker 402 determines the audio activity based on the one or more determined audio events and context, the determined audio activities may be kept track of by storing the determined audio activities in an audio activity data buffer 144. Summaries of the tracked determined audio activities may be based on a summary mode in a tracked audio activity summarizer 502 (see FIG. 5).

A person having ordinary skill in the art would appreciate that in an embodiment the text label of the tracked determined audio activities may also be stored in the audio activity data buffer 144.

Within this disclosure, reference to an audio activity or determined audio activity may include audio or speech samples of the audio activity, or interchangeably reference to an audio activity or determined audio activity may include a text label. In addition, an audio activity or determined audio activity may be a collection of audio activities, and reference to the collection of audio activities may also be called an audio activity. For example, "Max runs on cement in the afternoons" may be a collection of a series of audio activities of Max running over at least a few days between 1 pm and 5 pm. The collection of audio activities "Max runs on cement in the afternoons" may also be referred to as an audio activity. It may be possible for one or more of the sensor(s) 108 to aid with the collection of audio activities and increase the confidence of the audio event detection, based on a correlation of the one or more sensor(s) 108 data.

In the same or alternate embodiment, the collection of audio activities "Max runs on cement" may be aided by the one or more sensors 108, that detect breathing, heart rates, shape of acceleration response based on the impact on the cement as Max take steps. For example, a sensor detector 816 in detector bank 804 may detect the output of these one or more sensor(s) 108 (e.g., inertial and photoplethysmogram (PPG) or heart rate (HR) sensors) (see FIG. 8). The batch process 800 may be use the other sensor inputs such as sensor a metric or visual metric, in addition to the sound metric associated with the breathing, the sound of the steps, and the recorded sound of the impact of the steps on the cement. Thus, the batch process includes that an audio activity, like running for example, may be based on other sensor input, in addition with one or more of the detectors in the detector bank 804 (see FIG. 8).

The detector bank 804 may in some embodiments include a visual context detector 814 to capture local video content captured from the one or more camera(s) 106 that may be used to correlate the video content with the audio signal to increase the confidence determination of the audio event, or in some embodiments aid with the determination of the audio event. Similarly, in some embodiments, the detector bank 804 may in some embodiments include a sensor detector 816 that may be used to correlate one or more sensor readings with the audio signal to increase the confidence determination of the audio event, or in some embodiments aid with the determination of the audio event. In the same or alternate embodiment, the sensor detector 816 may be aided by the one or more sensor(s) 108 (e.g., inertial and photoplethysmogram (PPG) or heart rate (HR) sensors).

In an alternate embodiment, tracking of meeting with a specific person on a specific day (e.g., Friday) or attending different group meetings on a specific day (e.g., Friday) may be used as a collection of audio activities, and reference to the collection of audio activities ("Friday meetings") may also be called an audio activity.

Figure 5:
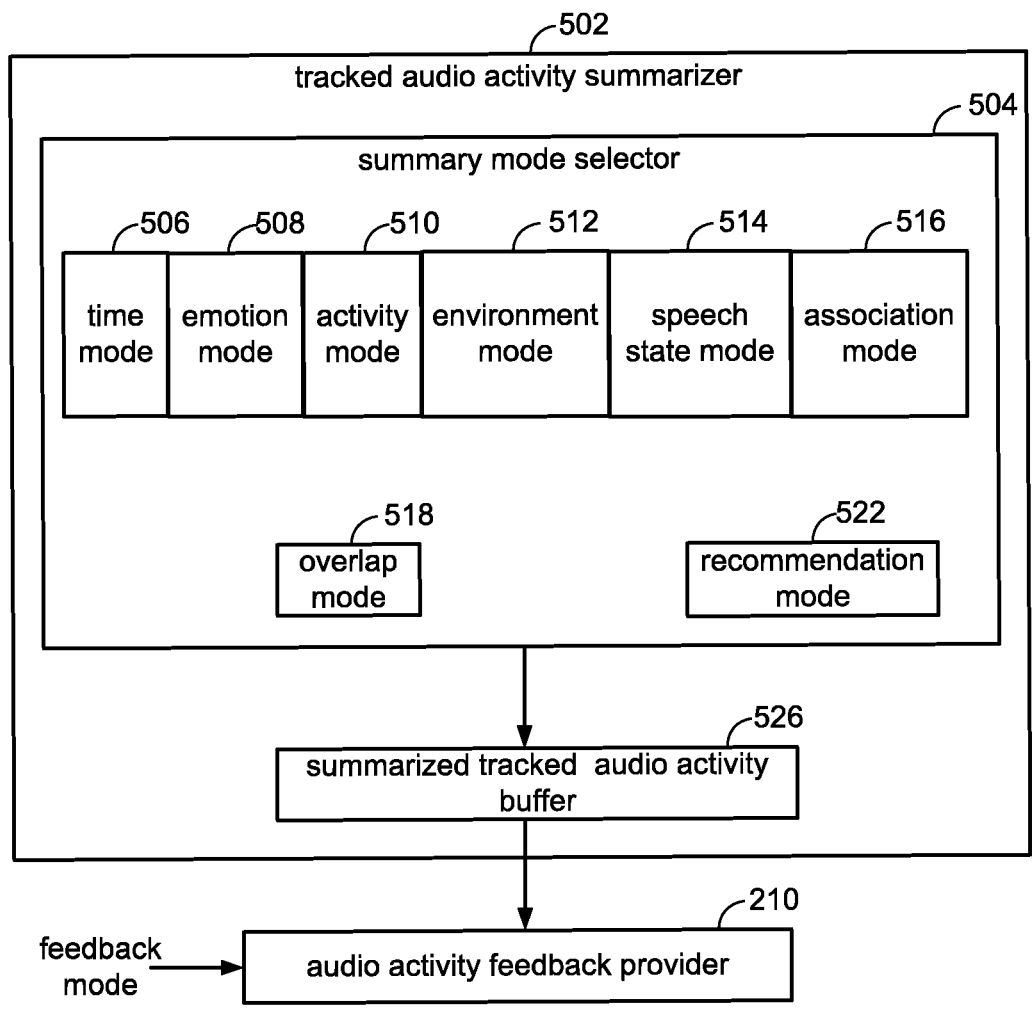
FIG. 5 illustrates exemplary embodiments of a tracked activity summarizer.

FIG. 5 illustrates exemplary embodiments of a tracked activity summarizer. The tracked audio activity summarizer 502 may provide as output summarized audio activity. A summary of audio activity may be based on a summary mode. Exemplary summary modes are illustrated in the summary mode selector 504. For example, a summary mode may be a time mode 506, emotion mode 508, activity mode 510, environment mode 512, speech state mode 514, association mode 516, overlap mode 518, and/or recommendation mode 524.

In an embodiment, a time mode summary mode may provide a summary of audio activities based on a time duration. For example, the time duration may be over the last 10 minutes, 60 minutes, 3 hours, day, week, month, quarters, years, etc. In addition, the time mode may be defined by the user of device 100. As an example, the user of device 100 may define the time duration as an afternoon being defined as 1 pm and 5 pm. Thus, a summarized tracked audio activity of how many afternoons Max has run on cement over the last year may be provided by the tracked audio activity summarizer. In an embodiment, the time mode may summarize statistics for conversations that lasted 15 minutes or more. For example, in a conversation between person A (e.g., Max) and person B (e.g., Zoe), the tracked audio activity summarizer may determine that Zoe spoke 50% of the time and Max spoke between 50% of the time during their twenty-minute conversation.

Figure 8:
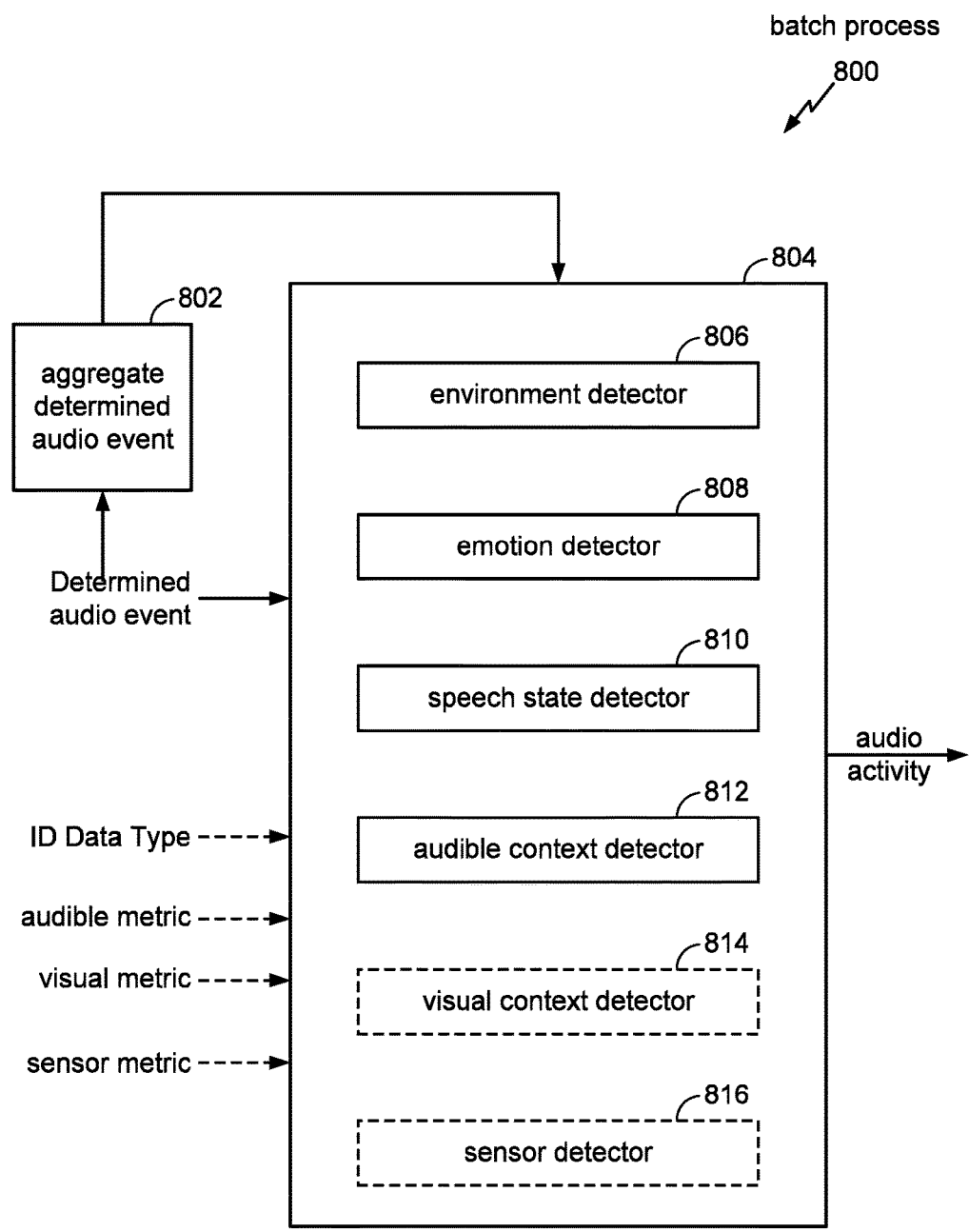
FIG. 8 illustrates an embodiment to batch process audio events.

In an embodiment, an emotion mode summary mode may provide a summary of audio activities based on various emotions detected by an emotion detector (see FIG. 8). For example, in an embodiment, a summary of which audio activities resulted based on being happy, excited, scared, angry, tender, or sad may be provided by the tracked audio activity summarizer 502, based on determining the audio events of laughing, crying, screaming and yelling with an emotion detector.

In an embodiment, an activity mode summary mode may provide a summary of audio activities based on various types of activities. For example, sports are a type of an activity. The tracked audio activity summarizer 502 may provide a summary of audio activities during a specific sport. For example, if a user (e.g., Max) of device 100, plays basketball, the audio activities may indicate how many times Max dribbled the ball before taking a shot, or for how long he dribbled for in a game.

In an embodiment, an environment mode summary mode may provide a summary of audio activities based on the type of environment. In certain environments, sounds may be louder (e.g., a construction site), quiet (e.g., a library), or low-level (e.g., in some offices or homes). The environment may be classified with other types, e.g., a crowd-noise, that could help identify where the audio activity took place. The tracked audio activity summarizer 502 may provide a summary of audio activities based on whether the environment is quiet, loud, low-level, there is crowd-noise, or other classifications of the environment type.

In an embodiment, a speech state mode summary mode may provide a summary of audio activities based on the speech state of a person. Examples of different speech states may be classified as passive listening (e.g., to a television or radio), listening (e.g., in a conversation), or talking (e.g., in a conversation). The tracked audio activity summarizer 502 may provide a summary of audio activities based on whether the environment is quiet, loud, low-level, there is crowd-noise, or other classifications of the speech state.

In an embodiment, an association mode summary mode may provide a summary of audio activities based on an association mode. An association mode may be based on association of a person or a group of people. For example, summaries may be desired based on audio activities when person A and person B are performing an audio activity together. For example, they are playing tennis, pool, chatting over coffee, driving in a car to work, etc.

In an alternate embodiment, there may be a location mode (not shown) that may allow for summarized tracked audio activities to be based on location information. The location information possibly may be from a different source, or determined after the audio event (e.g., from a logged Wi-Fi packet sniff), and may allow the summarized activities to be displayed or provided based on a location. For example, locations may be at home, work, driving, tennis club, coffee shop, and the like.

In the same or alternate embodiment, a summary may be provided by selecting two or more summary modes. As an example, after selecting the overlap mode 518, a time mode 506, and an emotion mode 508 may both be selected. Another example, is after selecting overlap mode, to select activity mode 510 and speech state mode 514. Thus, in the overlap mode a summary may be provided based on two or more summary modes.

In the same or alternate embodiment, there may be a recommendation mode 522 to provide feedback to the user. For example, there may be feedback to correct bad speaking habits where a person is saying "emm", "umm", or overusing certain words (e.g., "like"). The feedback may be made in real-time and/or post analysis feedback. In the same or alternate embodiment, the summary modes may be selected through speaking keywords that are processed by the device 100 that includes the tracked audio activity summarizer 502. The user may speak exemplary phrases, "time mode", "emotion mode", "environment mode", speech state mode", "association mode", "overlap mode", and/or "recommendation mode" to select one or more summary modes. In the same or alternate embodiment, selection of multiple embodiments may be performed without an overlap mode per se, but by selecting two or more summary modes.

In the same or alternate embodiment, the summary modes may be selected through speaking keywords that are processed by the device 100 that includes the tracked audio activity summarizer 502. The user may speak exemplary phrases, "time mode", "emotion mode", "environment mode", "speech state mode", "association mode", "overlap mode", and/or "recommendation mode" to select one or more summary modes. In the same or alternate embodiment, selection of multiple embodiments may be performed without an overlap mode per se, but by selecting two or more summary modes.

In the same or alternate embodiment, the tracked audio activity summarizer 502 may be integrated or coupled to a display device 100, and selection of a summary mode may be based on touching the display device 100 where a summary mode is radio button choice.

The radio buttons may be touched on the screen to select a time mode 506, emotion mode 508, activity mode 510, environment mode 512, speech state mode 514, association mode 516, overlap mode 518, and/or recommendation mode 524. In an alternate embodiment, there is not an express overlap mode 518 shown on a radio button, but the ability to select more than one summary mode by touching one or more of the summary modes described may allow the tracked audio activity summarizer 502 to provide a summary of one or more audio activities based on one or more summary modes.

In an embodiment, to select a summary mode in the summary mode selector 504 may be through pressing one or more push buttons integrated or coupled to device 100 that includes a tracked audio activity summarizer 502. For example, pressing a push button may select the time mode 506. Pressing the push button a second time may select the emotion mode 516. A subsequent push may select the activity mode 510. The next push may select the environment mode 512. The push after that may select the speech state mode 514. Another push of the button may select the association mode 516.

In the same or alternative embodiment, if there is an additional button integrated or coupled to the device 100 that includes the tracked audio activity summarizer 502, an overlap mode 518 may be selected to provide summarized audio activities based on multiple summary modes. For example, after selecting the overlap mode 518, a time mode 506 and an emotion mode 508 may both be selected, and a summary may be provided based on both time and emotion.

The feedback mode on the summarized audio in the summarized tracked audio activity buffer 526 may be audible, or visual, or both audible and visual. For example, the summarized tracked audio activities illustrated in FIG. 9 and FIG. 10 may be described audibly through a loudspeaker. In addition, the summarized tracked audio activities may be displayed on a graphical user interface (GUI) as illustrated in FIG. 9, and FIG. 10 in chart form or through another visual representation that illustrates portions, percentages, or links between different audio activities. A visual feedback mode may also include text. For example, a list of the audio activities may be displayed or stored in memory. The summarized tracked audio activity buffer 526 is also referenced as summarized tracked audio activity buffer 144.

Figure 6:
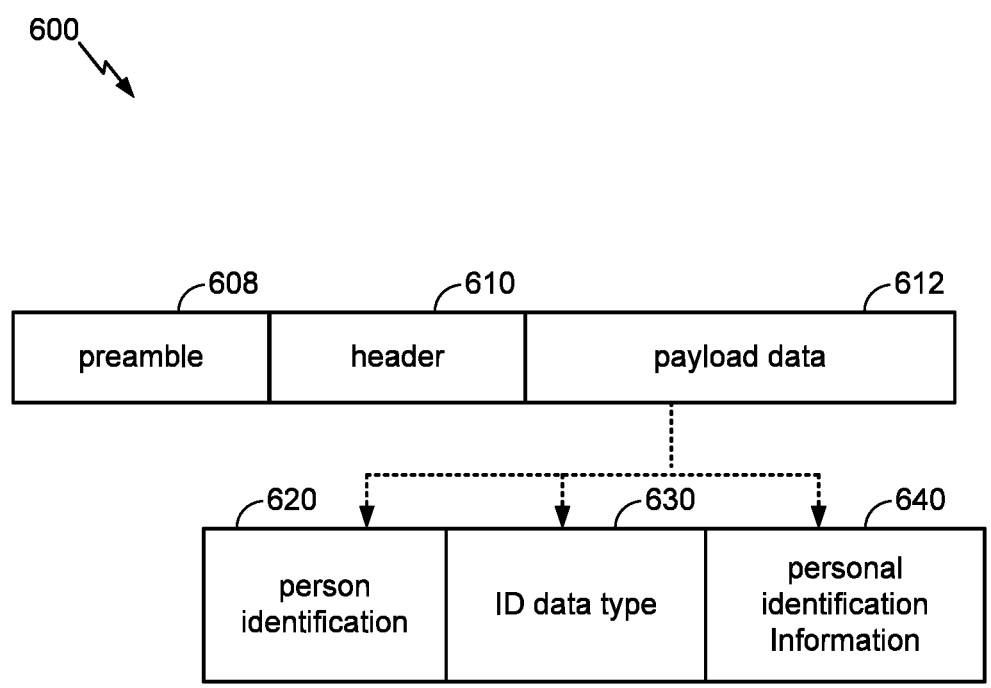
FIG. 6 illustrates different fields that may be part of a packet.

FIG. 6 illustrates different fields that may be part of a packet 600 during communication between two devices. When the communication is based on a wireless connection, the packet 600 may referred to as a wireless packet. The packet (whether wireless or not) 600 may include a preamble 608, a header 610, and payload data 612. A preamble 608 may be used to synchronize the transmission and/or reception between two devices exchanging information. The header 610 may include instructions about the data carried within the packet 600, for example the length or how many fields or sub-fields are contained within the packet 600.

In an embodiment, the payload data 612 of the packet may include person identification 620, i.e., one or more bits that indicate who the person is. The person identification 620 may be based on the result of speech recognition, face recognition, or some other recognition technology. If the packet 600 is received by device 100 the recognition technology may be located on another device. In an embodiment, the local device, i.e., device 100, may have the recognition technology integrated and the packet 600 may be transmitted outside the device 100.

In the same or alternate embodiment, the packet 600 may include an ID data type 630. For example, an ID data type 630 may indicate if the recognition was a result of speech recognition or face recognition, or some other recognition technology that is located on a remote device and sent to the local device, i.e., device 100.

In the same or alternate embodiment, payload data 612 may include personal identification information 640. Numerous examples (740A1-740E1, and 740A2-740E2) of personal identification information are illustrated in FIG. 7.

FIG. 7 illustrates different type of personal identification. Personal identification that may be captured based on one or more microphones 102 is illustrated in FIG. 7 as 740A1-740E1. A voice activity detection flag 740A1 may represent when there are voiced or unvoiced speech. The voiced frequency 740A2 may be quantized linear predictive coefficients or other similar representation of the envelope of the frequency profile (amplitude and formant locations) of a person speaking. The hashed voice frame 740A3 may represent a voice print that is unique for a specific person. The duration of recent speech 740A4 may be the length of time someone was speaking, for example 5 seconds. The pitch 740A5 may represent the pitch of a person speaking. Children and women tend to have higher pitches, while men tend to have lower pitches.

In the same or alternate embodiment, additional or alternative personal identification that may be captured based on one or more sensors 108 is illustrated in FIG. 7 as 740A2-740E2. The temperature of a person's head 740A2 may be used to indicate if they are in a physical environment that is too cold or too hot. If the temperature is too hot or too cold, the person that may be an indicator that the person is under stress. Correlating the temperature readings with other sensor readings may provide more context to aid in determining the audio activity being tracked. A person's heartbeat 740B2 may also may provide more context relating to stress, calmness, and/or exercise to aid in determining the audio activity being tracked and summarized. The body part movement 740C2 of a person may indicate if the person is running, walking, standing, raising an arm, rotating a wrist, head movement. These movements of the body part may provide more context that aid in the audio activity being tracked and summarized. The proximity to the nearest object 740D2 may be another indicator that provides context that aids in the audio activity being tracked and summarized. The orientation of the device ID 740E2 may be another indicator that provides context that aids in the audio activity being tracked and summarized.

FIG. 8 illustrates an embodiment to batch process audio events. As described previously with reference to FIG. 4, audio events may be batched processed 800 in audio activity tracker 402. A determined audio event may be aggregated 802 with prior determined audio events and provided to a detector bank 804. For example, a determined audio event may be that a keyboard key clicked. If a number of keyboard clicks are aggregated, the aggregation of the determined audio events may be that keyboard keys are clicking. Another example may be that a determined audio event may be that a foot step was taken on sand. The aggregation of a number audio events (such as footsteps or keyboard clicks) may be may be sent to the detector bank 84.

The detector bank 804 may include an environment detector 806, an emotion detector 808, speech state detector 810, and audible context detector 812. In the same or alternate embodiment, additional inputs may be processed by the detector bank 804. For example, ID data type, an audible metric such as a voice metric, a visual metric, and/or a sensor metric may serve as inputs into the detector bank 804 and used by one or more of the detectors in the detector bank 804. The additional context from the sensors may provide more context. For example, a work phrase, or coffee shop phrase (i.e, a phrase associated with a work environment or in a coffee shop) may be uttered by someone that is captured by the one or more microphones 102. The audible context detector 812 based on determining the context of the phrase may aid in the determination that the audio activity output from the detector bank 804 is a person working on a laptop in an office, or typing at a coffee shop. In another example, an environment detector 806 may detect ocean waves and aid in the determination that the audio activity output from the detector bank 804 is a person running on sand near the ocean.

The detector bank 804 or the event classifier bank 320 based on audible inputs from the one or more microphones 102 may rely on machine learning, or other adaptive or classification technologies for detection. For example, the emotion detector 808 and the audible context detector 812 may be based use a deep neural network. As another example, an audio event such as classifying differences between adult versus children, or males versus females may be based on a tone classifier or a deep neural network. Another example, in the event classifier bank 320 may be to use format structure classifiers and tone classifiers to determine content from televisions or loudspeakers that are playing music. The detector bank 804 may determine audio activity based on personal identification information 640 discussed earlier (not drawn in FIG. 8).

The detector bank 804 may in some embodiments include a visual context detector 814 to capture local video content captured from the one or more camera(s) 106 that may be used to correlate the video content with the audio signal to increase the confidence determination of the audio event, or in some embodiments aid with the determination of the audio event. Similarly, in some embodiments, the detector bank 804 may in some embodiments include a sensor detector 816 that may be used to correlate one or more sensor readings with the audio signal to increase the confidence determination of the audio event, or in some embodiments aid with the determination of the audio event. In the same or alternate embodiment, the sensor detector 816 may be aided by the one or more sensor(s) 108 (e.g., inertial and photoplethysmogram (PPG) or heart rate (HR) sensors)).

The one or more microphones 102 or the processors coupled to the microphones 102 may be duty cycled to save power. This may allow for longer period of time to continuously monitor audio activity. Detection of spoken words in some systems allow for a processor to be taken out of idle mode and turn on additional microphones. Device 100 may have microphones 102 that are closer or further away from the mouth of a person talking. One or more microphones 201 may allow volume monitoring. For example, a hearable may have external microphones that allow for volume monitoring. One or more microphones 102 may allow for detection of shouting, talking, whispering and the like.

The detectors that are based on audible inputs may also include trained voice templates. As device 100 may include an antenna 112, and transceiver 122, the trained voice templates may be exchanged or shared between two devices which could facilitate less training on devices that do not have the trained voice templates. Different trusted groups could share the training data. An example of a trusted group is a family. Among family members the trained voice templates may be exchanged or shared between devices. The antenna 112 and transceiver 122, allow for the tracked and summarized audio activities to be transmitted to another device. The transmission may be based on authorization by the user of the audio activity tracker and summarizer device (e.g., device 100). For example, a person has cried for three hours and hasn't spoken to anyone may be transmitted to a loved one. Another example, may be that an elderly relative has had not had a social interaction for a period of time, and a recommendation may be made to give the relative a call or go visit. In yet another example, may be that a person has been exposed to an excessive amount of background noise over a certain threshold level.

FIG. 9 illustrates an exemplary view of a summary of daily audio activity on a GUI 902 on a display device 110. In the exemplary view of FIG. 9, audio activities 904 that a person participated in are illustrated. A summary mode may be shown 906 to a user on a display device 110. Different summary modes may be selected by, for example, by a drop down menu arrow 908 (or may be selected by a radio button or by typing in the name of the summary mode, as examples). For example, if the summary mode is a time mode, and the person designated a particular time period the summary of activities may be a person drover a car (A), listened to Joe (B), listened to music (C), spoke with Mary (D), was in a quiet environment (E), and listened to television (F). The pie chart allows for displaying proportions.

In the same or alternate embodiment, a user may also select a threshold associated with a summary mode. For example, audio activities that lasted less than 10 minutes may not necessarily be displayed. As such, there may be other audio activities that the person participated in during the particular time period, but are not illustrated on the GUI 902 on the display device 110.

FIG. 10 illustrates another exemplary view of a link to an emotion associated with the summarized tracked audio activities on a display. In the exemplary view of FIG. 10, the percentages of audio activities (A-F) may be linked to an emotion associated with the summarized tracked audio activity 1050 and displayed on a different GUI 1040 on a display device 110. Exemplary emotions may include, but are not limited to "bored", "neutral", "excited", or "happy".

Figure 11:
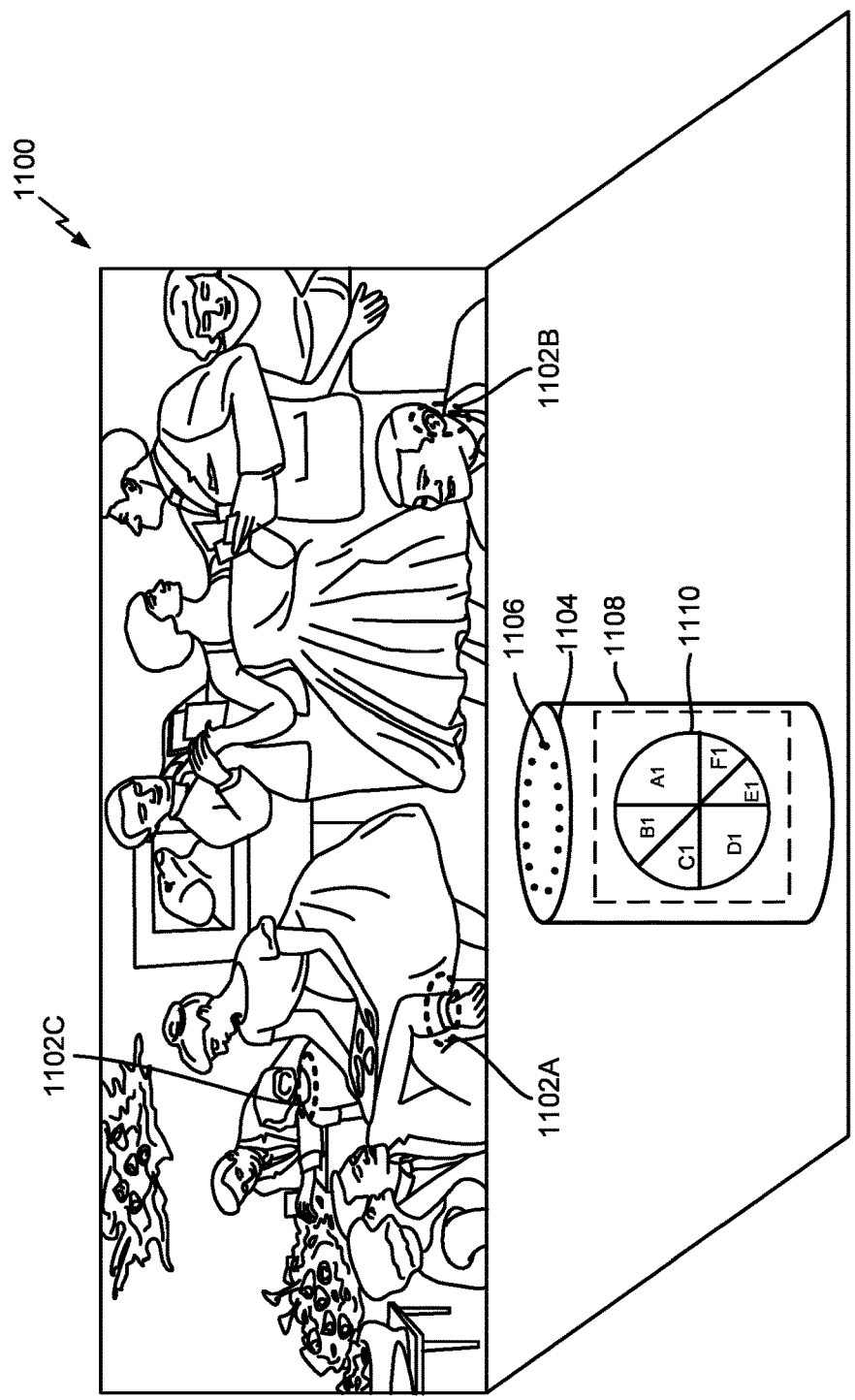
FIG. 11 illustrates an exemplary use case.

FIG. 11 illustrates an exemplary use case 1100. In FIG. 11, people are socializing at a gathering. At a gathering there may be a number of different audio activities that take place. Examples include watching a sports game on television (A1), singing happy birthday (B1), giving a toast (C1), a gift opening (D1), eating dinner (E1), or playing a game (F1). In the room or space where the people are gathered, there may be a device 1104 that includes an audio activity unit 202 and audio activity feedback provider 210. The device 1104 may include a microphone array 1106 that may function in a similar fashion to prior descriptions of one or more microphones 102. The device 1104 may include a display device with GUI 1108, that may display a summary of audio activities (e.g., A1-F1).

In the same or alternative embodiment, some of the people may be wearing a wearable device that includes an audio activity unit 202 and audio activity feedback provider 210 as disclosed herein. For example, a person has a wearable device around his wrist. The wearable device may be wrist band, or watch (both referenced as 1102A). Another person is wearing a hearable 1102B that includes an audio activity tracker as disclosed herein. Another person has a wearable device around her neck 1102C. The wearable device may be a necklace with a microphone array (i.e., one or more microphones 102), or it may be socially acceptable in the future to wear a device that includes one or more microphones 102 around the neck. The wearables 1102A, 1102B, and 110C may provide a summary of audio activities in either visual or audible form. For example, the hearable 1102B and the wearable device around the neck 1102C may transfer the summarized audio activities to a display device. If the wearable device 1102A is a watch there is a display device integrated to the watch. If the wearable device 1102A is a wrist band without a display device, the summarized audio activities may be transferred to a display device. The wearables 1102A, 1102B, and 1102C may also include one or more loudspeakers to play out a summary of audio activities.

In a particular implementation, one or more components of the systems and devices disclosed herein may be integrated into a decoding system or apparatus (e.g., an electronic device, or a processor therein), into an encoding system or apparatus, or both. In other implementations, one or more components of the systems and devices disclosed herein may be integrated into a wireless telephone, smart glasses, or future versions of augmented reality devices, virtual reality devices, mixed reality devices, extended reality devices, a robot, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

In conjunction with the described techniques, a device includes means for determining an audio event based on receiving an audio signal, means for tracking an audio activity based on the determined audio event, means for summarizing the tracked audio activity based on a summary mode, and means for providing feedback of the summarized tracked audio event. In addition, the device may include means for selecting the feedback mode.

A skilled artisan would appreciate that in some embodiments, the device 100, without the peripherals (e.g. one or more sensors, one or more cameras, and/or display device), or some of the components (e.g. the CODEC, antennas, transceiver), where the device 100 is a server it may also be configured to determine an audio event based on receiving an audio signal, track audio activity based on the determined audio event, summarize the tracked audio activity based on a summary mode, and provide feedback of the summarized tracked audio activity based on a feedback mode.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
    one or more processors configured to:
        determine an audio event based on receiving an audio signal;
        track audio activity based on the determined audio event;
        summarize the tracked audio activity based on a user selection of a summary mode, wherein the summary mode is one or more of the following: a time mode, an emotion mode, an activity mode, an environment mode, a speech state mode, an association mode, an overlap mode, or a recommendation mode; and
        provide feedback of the summarized tracked audio activity based on a feedback mode.

2. The device of claim 1, further comprising an audio decoder coupled to the one or more processors, and the audio decoder is configured to receive a packet from another device.

3. The device of claim 2, wherein the audio decoder is coupled to a payload data extractor, and the payload data extractor is configured to extract from the packet received from another device at least one of a person identification, identification type, personal identification information, remote device ID, or a timestamp.

4. The device of claim 2, further comprising an audio path selector configured to select whether an audio waveform, based on output from a one or microphones, is provided to an audio event determinator, or the packet received from another device is provided to the audio event determinator.

5. The device of claim 4, wherein the audio path selector is configured to receive controller input and provide a device mode.

6. The device of claim 1, further comprising one or more microphones, coupled to an audio CODEC configured to output an audio waveform, and configured to provide the audio waveform to the one or more processors.

7. The device of claim 6, wherein the determined audio event is based on at least classifying one voice metric, from a voice metric determinator unit, and the one or more processors include an audio event classifier bank configured to provide at least one of a local clock, local device identification value, and the audio event.

8. The device of claim 7, wherein the event classifier bank is controlled by a device mode.

9. The device of claim 1, further comprising a memory including a summarized tracked audio activity buffer.

10. The device of claim 9, wherein the one or more processors include an audio activity feedback provider configured to select the feedback mode.

11. The device of claim 10, further comprising a display device configured to display the visual feedback of summarized tracked audio activity when the visual feedback mode is selected.

12. The device of claim 10, further comprising one or more loudspeakers configured to produce the audible feedback of summarized tracked audio activity when the audible feedback mode is selected.

13. The device of claim 12, wherein the one or more loudspeakers are integrated into a hearable device.

14. The device of claim 1, wherein the one or more processors include an audio activity tracker to provide the tracked audio activity based on the summary mode, and wherein the audio activity tracker comprises comparing a previous audio event to determine if the determined audio event is a same audio event or a different audio event.

15. The device of claim 14, wherein the audio activity tracker is configured to batch process more than one audio event based on aggregating the determined audio event, and based on at least one of a timestamp, device identification value, or person identification value.

16. The device of claim 15, wherein the tracked audio activity is based on detecting at least one of environment, emotion, speech state, audible context, visual context, or a sensor reading.

17. The device of claim 16, wherein the tracked audio activity is additionally based on one of an identification data type, person identification and personal identification information.

18. The device of claim 1, further comprising a display device configured to represent a link of an emotion associated with the summarized tracked audio activity.

19. A method comprising:
determining an audio event based on receiving an audio signal;
tracking an audio activity based on the determined audio event;
summarizing the tracked audio activity based on a user selection of a summary mode, wherein the summary mode is one or more of the following: a time mode, an emotion mode, an activity mode, an environment mode, a speech state mode, an association mode, an overlap mode, or a recommendation mode; and
providing feedback of the summarized tracked audio activity based on a feedback mode.

20. The method of claim 19, further comprising selecting a feedback mode.

21. The method of claim 20, wherein the feedback of the summarized tracked audio activity is displayed when the feedback mode is a visual feedback mode.

22. The method of claim 20, wherein the feedback of the summarized tracked audio activity is audible when the feedback mode is an audible feedback mode.

23. The method of claim 19, wherein the summarized tracked audio activity is based on comparing a previous audio event to determine if the determined audio event is a same audio event or a different audio event.

24. The method of claim 19, wherein the summarized tracked audio activity batch processes more than one audio event based on aggregating the determined audio event.

25. The method of claim 19, wherein the summarized tracked audio activity is transmitted to another device.

26. An apparatus comprising:
means for determining an audio event based on receiving an audio signal;
means for tracking an audio activity based on the determined audio event;
means for summarizing the tracked audio activity based on a user selection of a summary mode wherein the summary mode is one or more of the following: a time mode, an emotion mode, an activity mode, an environment mode, a speech state mode, an association mode, an overlap mode, or a recommendation mode; and
means for providing feedback of the summarized tracked audio activity based on a feedback mode.

27. The apparatus of claim 26, further comprising means for selecting the feedback mode.

28. A non-transitory computer-readable storage medium having stored thereon instructions that, when executed, cause one or more processors of a device to:
determine an audio event based on receiving an audio signal;
track an audio activity based on the determined audio event;
summarize the tracked audio activity based on a user selection of a summary mode, wherein the summary mode is one or more of the following: a time mode, an emotion mode, an activity mode, an environment mode, a speech state mode, an association mode, an overlap mode, or a recommendation mode; and
provide feedback of the summarized tracked audio activity based on a feedback mode.

* * * * *